United States Patent
Zhang et al.

(10) Patent No.: US 9,355,081 B2
(45) Date of Patent: May 31, 2016

(54) TRANSFORMING HTML FORMS INTO MOBILE NATIVE FORMS

(71) Applicant: VMware, Inc., Palo Alto, CA (US)

(72) Inventors: Yao Zhang, Beijing (CN); Yu Xin Kou, Beijing (CN); Chang Yan Chi, Beijing (CN); Zhibin He, Beijing (CN); Junfei Wu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 172 days.

(21) Appl. No.: 14/304,756

(22) Filed: Jun. 13, 2014

(65) Prior Publication Data

US 2015/0363368 A1    Dec. 17, 2015

(51) Int. Cl.
G06F 17/22    (2006.01)
G06F 17/30    (2006.01)
G06F 17/24    (2006.01)

(52) U.S. Cl.
CPC .......... *G06F 17/2247* (2013.01); *G06F 17/243* (2013.01); *G06F 17/30893* (2013.01)

(58) Field of Classification Search
CPC .............. G06F 17/2247; G06F 17/243; G06F 17/30896
See application file for complete search history.

(56) References Cited

U.S. PATENT DOCUMENTS

| | | | |
|---|---|---|---|
| 6,725,238 B1 | 4/2004 | Auvenshine | |
| 6,920,480 B2 | 7/2005 | Mitchell et al. | |
| 7,020,721 B1 | 3/2006 | Levenberg | |
| 7,216,292 B1 * | 5/2007 | Snapper | G06F 17/243 715/234 |
| 7,275,212 B2 | 9/2007 | Leichtling | |
| 7,418,472 B2 | 8/2008 | Shoemaker et al. | |
| 7,676,549 B2 | 3/2010 | McKeon et al. | |
| 8,650,494 B1 | 2/2014 | Sampath et al. | |
| 2002/0111995 A1 | 8/2002 | Mansour et al. | |
| 2004/0239681 A1 | 12/2004 | Robotham et al. | |
| 2007/0133876 A1 * | 6/2007 | Chande | C06F 17/243 382/181 |
| 2008/0120393 A1 | 5/2008 | Chen et al. | |
| 2008/0154824 A1 * | 6/2008 | Weir | G06N 7/005 706/45 |
| 2008/0255852 A1 | 10/2008 | Hu | |
| 2010/0082733 A1 | 4/2010 | Bernstein et al. | |
| 2010/0269046 A1 | 10/2010 | Pahlavan et al. | |
| 2010/0269047 A1 | 10/2010 | Pahlavan et al. | |
| 2010/0269152 A1 | 10/2010 | Pahlavan et al. | |
| 2011/0138295 A1 | 6/2011 | Momchilov et al. | |
| 2011/0246904 A1 | 10/2011 | Pinto et al. | |
| 2011/0314093 A1 | 12/2011 | Sheu et al. | |

(Continued)

OTHER PUBLICATIONS

U.S. Appl. No. 14/062,326, entitled "User-Interface Virtualization for Web Applications", filed Oct. 24, 2013.

(Continued)

*Primary Examiner* — Asher Kells
(74) *Attorney, Agent, or Firm* — Patterson & Sheridan, LLP

(57) ABSTRACT

Techniques disclosed herein transform HTML forms into forms with graphical user interfaces (UIs) native to mobile devices. A user interface virtualization (UIV) agent divides an HTML form into rows based on row breaks. The UIV agent then identifies name-input pairs in the HTML form by applying a trained naïve Bayes classifier to determine name fields, and mapping the name fields to corresponding input fields. In addition, the UIV agent generates metadata which includes both information describing the rows in the form and the name-input information. Based on the metadata, a native form renderer running in the client device draws the form with native UI elements. In addition, the native form renderer forwards native UI events as HTML events.

20 Claims, 6 Drawing Sheets

(56) References Cited

U.S. PATENT DOCUMENTS

| | | | |
|---|---|---|---|
| 2012/0042271 A1 | 2/2012 | Ma et al. | |
| 2012/0159310 A1* | 6/2012 | Chang | G06F 8/40 |
| | | | 715/239 |
| 2012/0226985 A1 | 9/2012 | Chervets et al. | |
| 2012/0311457 A1 | 12/2012 | O'Gorman | |
| 2013/0055102 A1 | 2/2013 | Matthews et al. | |
| 2013/0132856 A1 | 5/2013 | Binyamin et al. | |
| 2013/0246932 A1 | 9/2013 | Zaveri et al. | |
| 2013/0290856 A1 | 10/2013 | Beveridge et al. | |
| 2013/0290857 A1 | 10/2013 | Beveridge | |
| 2014/0013234 A1 | 1/2014 | Beveridge et al. | |
| 2014/0082512 A1 | 3/2014 | Neuert et al. | |
| 2014/0096014 A1 | 4/2014 | Johnson et al. | |
| 2014/0351684 A1* | 11/2014 | Smit | G06Q 10/06 |
| | | | 715/222 |

OTHER PUBLICATIONS

PhoneGap; website home page—http://phonegap.com/.
Appcelerator; website home page—http://www.appcelerator.com/.
Capriza; website home page—https://www.capriza.com/.
Citrix Mobility Pack; website—http://support.citrix.com/proddocs/topic/receiver/mobility-pack-wrapper.html.
Australian Office Action Patent Application No. 2013204723 dated Nov. 12, 2014, 3 pages.
Cheng-Li Tsao: "SmartVNC: SmartVNC: An Effective Remote Computing Solution for Smartphones", Sep. 23, 2011, pp. 13-24, XP055070896, ACM, [retrieved from the Internet Jul. 11, 2013].
Extended European Search Report, dated Jul. 22, 2013, Application No. EP 13164249.8, 7 pages.

* cited by examiner

TRANSFORMING HTML FORMS INTO MOBILE NATIVE FORMS

CROSS-REFERENCE TO RELATED APPLICATION(S)

The present application is related to U.S. patent application Ser. No. 14/062,326, filed Oct. 24, 2013 and entitled "User-Interface Virtualization for Web Applications", which is assigned to the same assignee as the present application.

BACKGROUND

Users of mobile devices with touch-screens face several challenges when interfacing with traditional web applications intended for access by a browser at a terminal with a full-size display. One challenge relates to reading and inputting information into HTML forms displayed on mobile devices. Such HTML forms are traditionally designed for personal computer (PC) browsers. However, PCs provide larger screens and require different user behaviors than mobile devices. As a result, it can be less convenient for users to read and input information into HTML forms on mobile devices. For instance, an HTML form designed for PC browsers may be displayed on mobile devices at a small size that is difficult to read. In such a case, the user may need to pinch to zoom in on input fields of the HTML form, enter information into the input fields, and then zoom back out.

SUMMARY

One or more embodiments of the present disclosure provide a method of dividing a markup document form into rows based on row breaks. The method generally includes determining name fields in the markup document form which specify the names of input fields. The method further includes determining the input fields in the markup document form which correspond to the determined name fields. In addition, the method includes generating UI metadata that specifies the rows and the name and input fields, and rendering, at a mobile client device and based on the UI metadata, a form having UI elements native to the mobile client device.

Further embodiments of the present invention include, without limitation, a non-transitory computer-readable storage medium that includes instructions that enable a computer system to implement one or more aspects of the above methods, as well as a computer system configured to implement one or more aspects of the above methods.

DETAILED DESCRIPTION

Embodiments disclosed herein provide techniques for transforming HTML forms into native graphical user interface (UI) forms and rendering the same at a client device. An HTML form may be characterized as being composed of a plurality of name-input pairs and some other action elements (e.g., submit buttons) that are located in a plurality of rows. Embodiments of the present disclosure describe a method for extracting such row and name-input information from an original HTML form, and then rendering such information as a native UI form (e.g., at a mobile client device).

In one embodiment, a native app or UI form is an application or UI form that is specifically designed to run on a device's operating system and machine firmware, and typically needs to be adapted for different devices. In comparison, a Web app (or browser application) or form is one in which all or some parts of the software are downloaded from the Web each time it is run. It can usually be accessed from all Web-capable mobile devices. For instance, a native application developed for the iPhone will need to run on its proprietary iOS platform. A Web app, however, is typically coded in a browser-rendered language such as HTML combined with JavaScript.

In one embodiment, a user interface virtualization (UIV) agent divides an HTML form into rows based on row breaks. Further, the UIV agent applies a trained naïve Bayes classifier to determine name fields in the HTML form, where a name field is one of two fields that form a name-input pair, and the name field in particular indicates what the input field is for. Experience has shown that name-input pairs are common in HTML forms. For example, on a log in screen, the "username" text that appears before the input box for entering a username would be a name field. After determining name fields, UIV agent maps the name fields to corresponding input fields and generates metadata which includes both information describing the rows in the form and the name-input information. Based on the metadata, a native form renderer running in the client device draws the form with native UI elements. In addition, the native form renderer forwards native UI events as HTML events. The events may include inputting text, clicking a button, and the like. Forwarding native UI events may include transforming the native UI events to HTML UI events and transmitting the HTML UI events to a browser (e.g., transmitting HTML UI events from a client mobile device to a browser running in a remote desktop). For example, native UI text input events may be forwarded as HTML events so that the same text that is entered into the native UI form is entered into the corresponding HTML form, and the event of pressing the submit button of the native UI form may be forwarded as an HTML button click event so that the corresponding HTML form is submitted.

Figure 1:
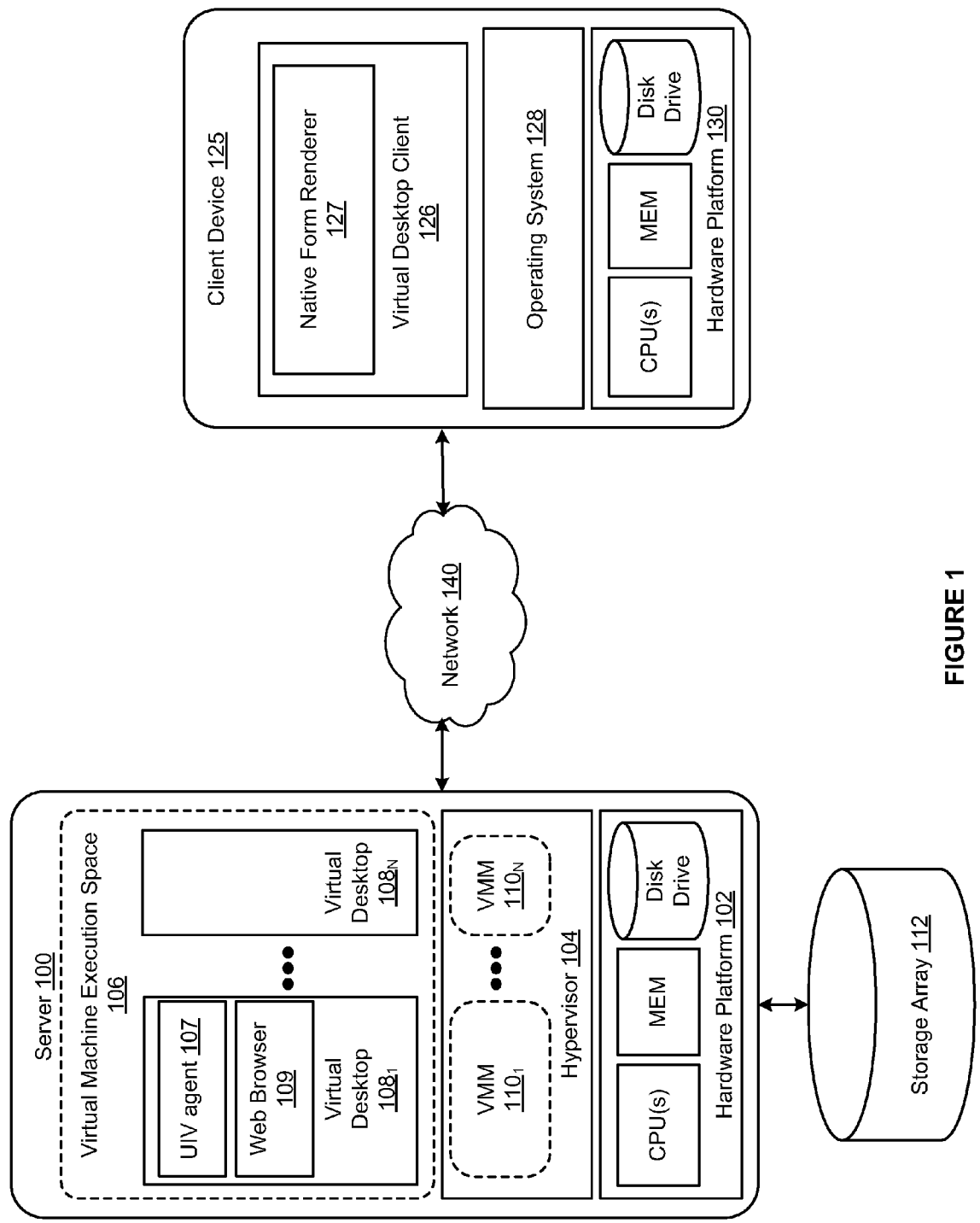
FIG. 1 illustrates a computer system architecture for displaying HTML forms as native UI forms at a client device, according to an embodiment.

FIG. 1 illustrates a computer system architecture for displaying HTML forms as native UI forms at a client device 125, according to an embodiment. As shown, computer system 100 includes a server 100 which is connected to client device 125 via a network 140 (e.g., the Internet). Server 100 is constructed on a server class hardware platform, such as hardware platform 102, which may be, e.g., an x86 architecture platform that includes a processor, system memory, and disk drive, among other things. Although a single server 100 is shown, it should be understood that multiple servers may be employed in, e.g., a server cluster.

A virtualization software layer, also referred to hereinafter as a hypervisor 104, is installed on top of hardware platform 102. Hypervisor 104 supports a virtual machine execution space 106 within which multiple virtual desktops (i.e., virtual machines running desktop operating systems and applications) may be concurrently instantiated and executed. As shown, virtual execution space 106 includes virtual desktops 108$_{1-N}$. In one embodiment, for each virtual desktop running on server 100, hypervisor 104 provides a corresponding virtual machine monitor (VMM) 110$_1$-110$_N$ that implements virtualization support such as emulated hardware to coordinate operations between hypervisor 104 and the virtual desktop. In addition, a virtual desktop management server (not shown), such as the VMware Virtual Desktop Manager product commercially available from VMware, Inc. of Palo Alto, Calif., may be placed between server 100 and client device 125 and function as a connection broker that manages connections between client terminals and virtual desktops 108$_{1-N}$.

As shown, a web browser 109 and a UIV agent 107 run in virtual desktop 108$_1$. Web browser 109 is configured to retrieve markup language (e.g., HTML), interpreted program code or scripting code executable by the browser, image data (e.g., GIF, JPEG files), formatting information (e.g., Cascading Style Sheets), etc. and render the content to generate a user interface (UI). Examples of web browsers include Microsoft Internet Explorer® and Mozilla Firefox®. UIV agent 107 is configured to traverse a document object model (DOM) tree generated by web browser 109, extract rows of an HTML form based on row breaks, determine name-input pairs using a trained naïve Bayes classifier, and output metadata which includes information specifying the rows and name-input pairs, as discussed in greater detail below. UIV agent 107 transmits such metadata to client device 125.

At client device 125, which may be any type of mobile device such as a mobile phone, a tablet device, a personal digital assistant (PDA), etc., a thin virtual desktop client 126 connects to one of the virtual machines running the desktop operating system and presents the virtual desktop to a user. As shown, the virtual desktop client 126 includes a native form renderer 127 which is configured to draw, based on metadata received from UIV agent 107 and using UI elements native to the client device 125, a form which corresponds to the original HTML form. In addition, native form renderer 127 receives and forwards native UI events as HTML events to browser 109.

Although a particular system architecture 100 is illustrated in FIG. 1, it should be understood that techniques similar to those disclosed herein may be implemented in computer systems having other architectures, such as those described in U.S. patent application Ser. No. 14/062,326, filed Oct. 24, 2013 and entitled "User-Interface Virtualization for Web Applications," which is incorporated by reference herein in its entirety. In particular, techniques disclosed herein do not require a remote desktop and may be applied to a mobile device accessing any webpage. For example, functions described herein as being performed by UIV agent 107 and native form renderer 127 may be performed by a single module executing on client device 125.

Figure 2:
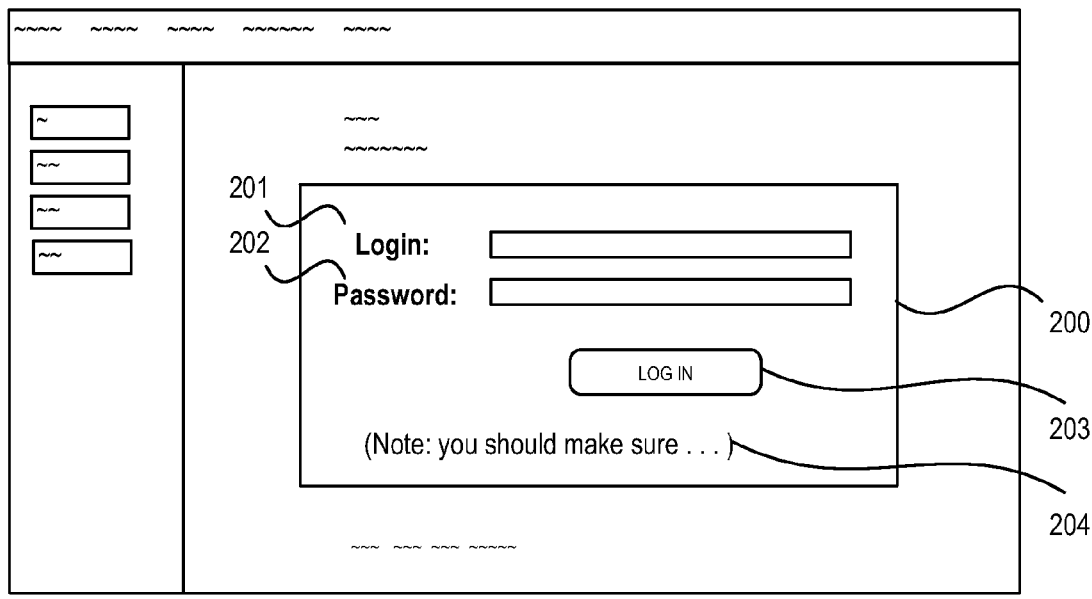
FIG. 2 illustrates an example HTML form and a native UI form generated based on the HTML form, according to an embodiment.
Figure 2:
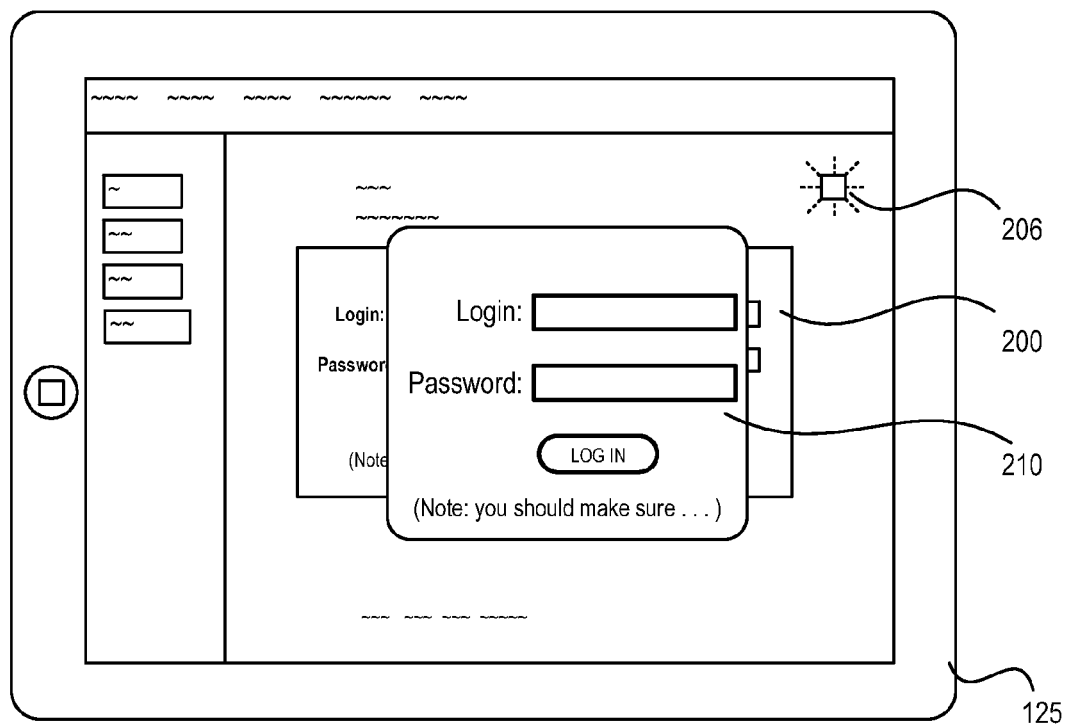

FIG. 2 illustrates an example HTML form 200 and a native UI form 240 generated based on HTML form 200, according to an embodiment. As shown in panel A, HTML form 200 includes four rows 201-204 containing a "Login:" name field and an input field, a "Password:" name field and an input field, a "Log in" button, and a "(Note: you should make sure . . . )" text field, respectively. UIV agent 107 is configured to traverse a DOM tree representing the HTML document, identify DOM nodes corresponding to HTML form 200, and generate row metadata for distinct rows in HTML form 200 based on row breaks. For example, UIV agent 107 may divide HTML form 200 into rows and generate the following JavaScript Object Notation (JSON) metadata which corresponds to HTML form 200:

TABLE 1

```
{
  "e":"form",
  "rows":[
    [{"iid":10, "e":"text", "text":"Login", ...},
     {"iid":11, "e":"input","type":"text", ...}],
    [{"iid":12, "e":"text", "text":"Password:", ...},
     {"iid":13, "e":"input","type":"password",...}],
    [{"iid":15, "e":"input","type":"submit","id":"",......}],
    [{"iid":16, "e":"text", "text":"(Note: you should make ...)", ...}]
  ]
}
```

In addition to dividing HTML form 200 into rows, UIV agent 107 identifies name-input pairs in the rows. Each row may include zero or more name-input pairs. As discussed, HTML form 200 includes the "Login:" name field and the "Password:" name field. In one embodiment, name fields may be identified using a trained naïve Bayes classifier, discussed in greater detail below. After name fields are identified, UIV agent 107 maps the name fields to corresponding input fields which appear nearby. UIV agent 107 then updates the metadata shown in Table 1 by adding a "for" attribute associating the name fields with their corresponding input fields. The resulting metadata is shown in Table 2. As shown, the "Login:" name field is a text field (element "e" is "text") with item ID ("iid") 10, a text input field has iid 11, the "Password:" is another text field with iid 12, etc. Further, the "Login:" name field having iid 110 is "for" the text input field having iid 11, indicating that this "Login:" name field and the text input field having iid 11 are a name-input pair. In contrast, the text field "(Note: you should make . . . )" having iid 16 is for "−1," indicating that there is no associated input field for this text field.

TABLE 2

```
{
  "e":"form",
  "rows":[
    [{"iid":10, "e":"text", "text":"Login", "for":11,...},
     {"iid":11, "e":"input","type":"text", ...}],
    [{"iid":12, "e":"text", "text":"Password:", "for":13,...},
     {"iid":13, "e":"input","type":"password",...}],
    [{"iid":15, "e":"input","type":"submit","id":"",......}],
    [{"iid":16, "e":"text", "text":"(Note: you should make ...)",
      "for":−1,...}]
  ]
}
```

Panel B shows an example rendering of the HTML form using native UI elements. Metadata generated by UIV agent 107 is sent to native form renderer 127 which runs in client device 125. As discussed, native form renderer 127 is responsible for constructing and displaying native UI elements having the same functionality and information as corresponding UI elements in the HTML form, based on the metadata. Such native UI elements may be classes for UI objects in the mobile device operating system (OS), as opposed to HTML elements which are components of HTML documents. For example, HTML input text field <input type="text"> may be mapped to native UI element UITextField in the iOS operating system, to native UI element EditText in the Andriod OS, and to native UI element TextBox in Windows. Other examples of mappings between HTML elements and native UI elements for the iOS operating system are set forth in Table 3.

TABLE 3

| HTML | iOS |
|---|---|
| <form> | UITableView |
| <button><br><input type="submit"><br><input type="button"> | UIButton |
| <label><br><span>...</span> | UILabel |
| <input type="checkbox"> | UISwitch |
| <input type="radio"> | Customized UIView |
| <input type="selected"> | UIPopoverController&UITableView(iPad)<br>UITableView(iPhone) |
| <input type="text"> | UITextField |
| <input type="password"> | UITextField whose secureTextEntry = YES |
| <textarea> | UITextView |
| <img> | UIImageView |
| alert | UIAlertView |

Returning to the FIG. 2, native UI form 210 is rendered in front of the original HTML form 200. Also rendered is an annotation or a button 206 which indicates availability of native UI form 210. In one embodiment, native form 210 may be rendered in response to the user pressing annotation or button 206. When the user enters text into a field of native form 210, native form renderer 127 may enter the same text in the HTML text input field of HTML form 200. That is, native form renderer 127 forwards native UI events as HTML events to the browser so that, among other things, text that is entered into native form 210 is also entered into HTML form 200. In addition, native form renderer 127 may forward events such as pressing on the "LOG IN" button in native form 210 so that the "LOG IN" button in HTML form 200 is also pressed.

Figure 3:
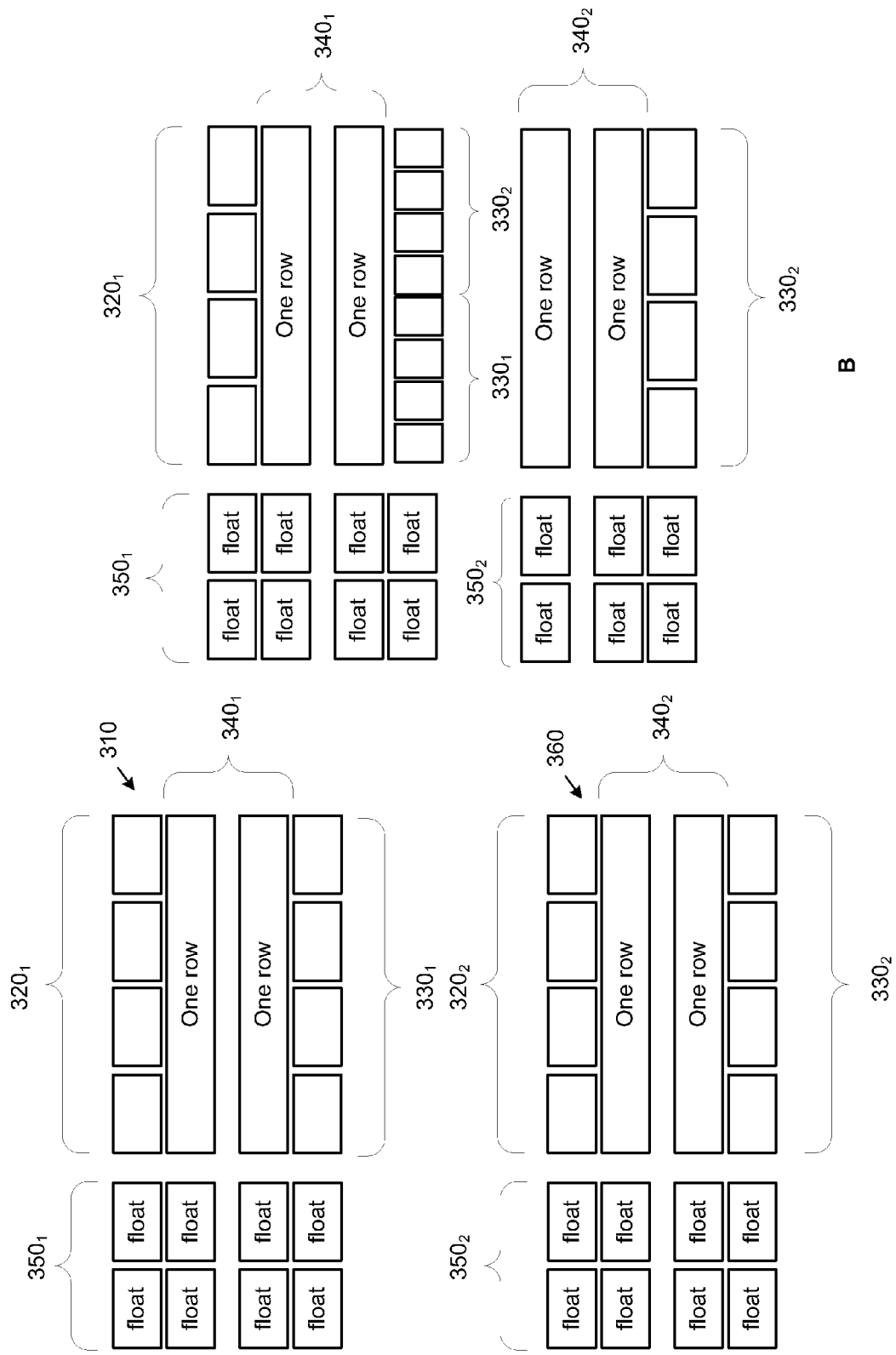
FIG. 3 illustrates an approach for dividing an HTML form into rows, according to an embodiment.

FIG. 3 illustrates an approach for dividing an HTML form into rows, according to an embodiment. A row may be characterized as a set of adjacent HTML elements which do not contain any line breaks (e.g., caused by <br> element). It is recognized that some HTML forms may be explicitly structured in rows, such as in row elements (e.g., <tr>) of an HTML table element (e.g., <table>). In such cases, techniques described herein are adapted to simply divide the HTML into rows as expressly structured. However, recent techniques for designing HTML pages, especially forms, have moved away from expressly structuring a webpage and towards laying out an HTML form using a combination of block-level, inline-level, float elements, and style properties which are rendered in rows. In such cases, the described techniques may be used to decompose an HTML form into an array of rows, which is useful for matching name-input information, as described later.

Panel A shows how two DOM nodes of a form include (and may be decomposed into) a first set 310 of float elements $350_1$, pre-inline elements $320_1$, complete rows $340_1$, and sur-inline elements $330_1$, and a second set 320 of float elements $350_2$, pre-inline elements $320_2$, inside rows $340_2$, and sur-inline elements $330_2$. In one embodiment, UIV agent 107 may identify row breaks to divide a form into rows. To do so, UIV agent 107 checks all block elements, inline elements, and float elements in the form. Block elements are elements such as <p>, <table>, <h1>, that typically occupy one or more rows exclusively and generate two row breaks, one before and one after the block element. An exception is a float element, which is a type of block element that floats to the beginning or end of a row and does not generate row breaks. Float elements are frequently used in forms for improved layout. In contrast to block elements, in-line elements do not generate row breaks and are typically displayed alongside other elements in the same row.

To divide the HTML form into rows, UIV agent 107 places inline elements into a single row (e.g., rows $340_{1-2}$) until a row break that is caused by, e.g., a block element being encountered in a DOM node corresponding to the HTML form. If a float element is encountered, UIV agent 107 places the float element at the beginning or end of the current row, as appropriate. Illustratively, float elements $350_{1-2}$ are placed at the beginning of rows $340_{1-2}$. It should be understood that in DOM nodes, some inline elements may appear at the beginning or end of each DOM node and before or after a row break, respectively. Such inline elements are referred to herein as pre-inline (e.g., $320_1$) and sur-inline (e.g., $330_1$) elements, respectively, and may be added either to the row generated from sur-inline elements of a previous DOM node or to a row with pre-inline elements from a next DOM node. As shown in panel B, sur-inline elements $330_1$ are merged with pre-inline elements $330_2$ to form another row.

Figure 4:
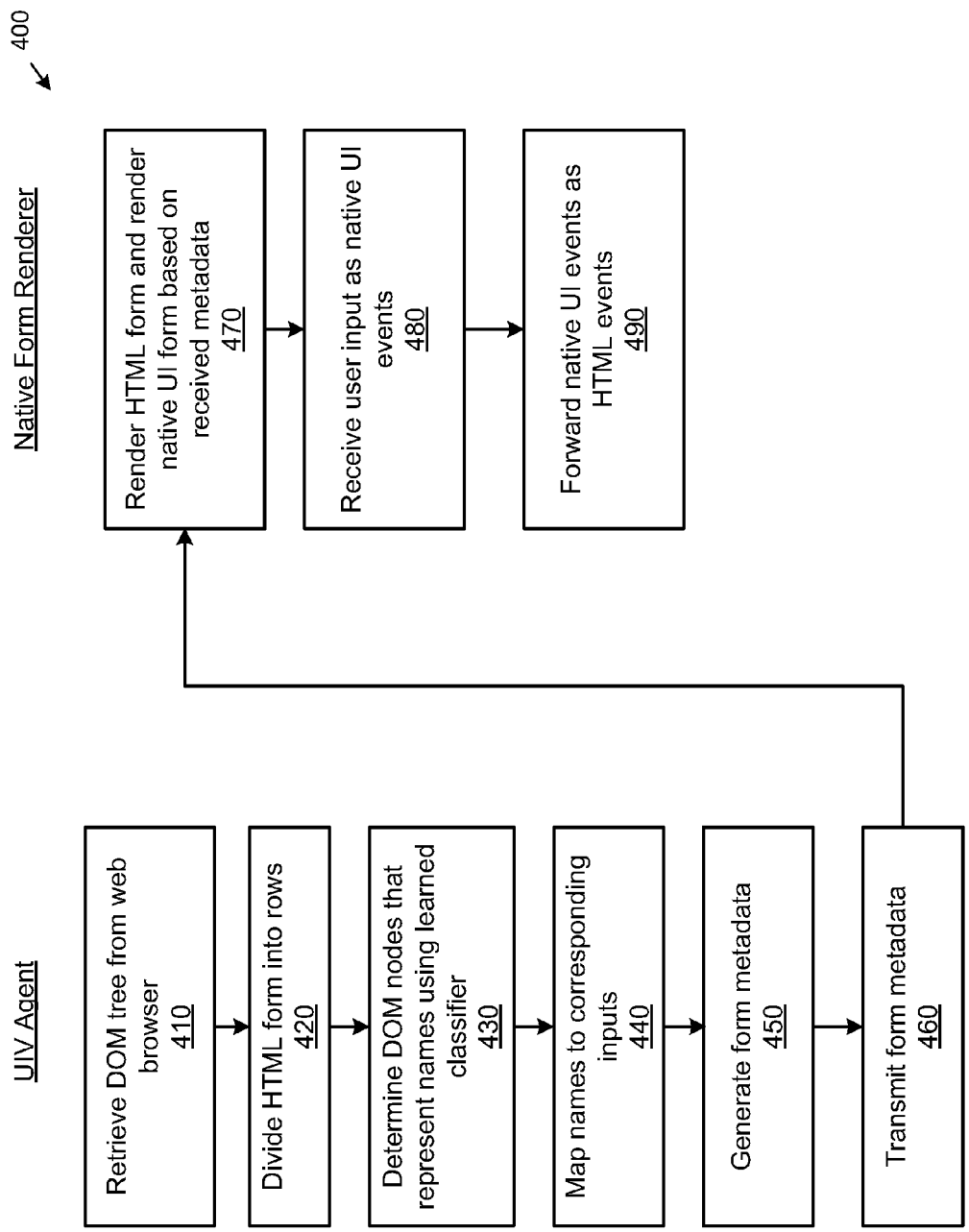
FIG. 4 illustrates a method for generating a graphical user interface (GUI) for an HTML form that is to be displayed on a client device, according to an embodiment.

FIG. 4 illustrates a method 400 for generating a graphical user interface for an HTML form that is to be displayed on a client device, according to an embodiment. As shown, the method 400 begins at step 410, where UIV agent 107 retrieves a DOM tree from a web application. In one embodiment, UIV agent 107 may include an intermediary agent which runs as a plugin in the web application and retrieves the DOM tree. In alternative embodiments, UIV agent 107 may parse HTML documents itself to generate DOM trees, or performs steps similar to steps 420-460, discussed below, without relying on a DOM tree.

At step 420, UIV agent 107 divides an HTML form in the DOM tree into rows. Given the DOM tree retrieved at step 410, UIV agent 107 may traverse the DOM tree, identify DOM nodes corresponding to forms, decompose the identified DOM nodes, and merge the decomposed DOM nodes into rows. As discussed, UIV agent 107 may identify row breaks to divide the form into rows. In particular, UIV agent 107 may place inline elements of a HTML form into a single row until a row break that is caused by, e.g., a block element is encountered in a DOM node corresponding to the form. If a float element is encountered, UIV agent 107 places the float element at the beginning or end of the current row, as appropriate. Further, some inline elements may appear at the beginning or end of each DOM node, and such pre-inline and sur-inline elements may be merged with the row generated from sur-inline elements of a previous DOM node or to a row with pre-inline elements from a next DOM node, respectively.

At step 430, UIV agent 107 determines DOM nodes that represent names using a learned classifier. Name-input semantic information is important for building an accurate form layout. UIV agent 107 may include a name-input matching engine that groups names and inputs together as name-input pairs. The name-input matching engine is a machine learning system that is trained to classify text DOM nodes as either a name of an input field or not, i.e., a "non-name" field. During the training phase, a number of HTML forms may be collected from the internet as raw data and training data may be generated from the raw data by manually identifying name-input pairs, i.e., manually classifying the HTML form elements. Such training data may then be used to calculate prior probabilities and build a naïve Bayes classifier. As typical in machine learning, the trained naïve Bayes classifier may be validated to determine accuracy of the classifier.

As discussed in greater detail below with respect to FIG. 6, the naïve Bayes classifier may be applied to determine both a probability that a given DOM node is a "name" of an input field and a probability that the given DOM node is not a "name" of an input field. In such a case, UIV agent 107 may determine that the given DOM node is a name if the probability that the given DOM node is a name is greater than the probability that the given DOM node is not a name.

At step 440, UIV agent 107 maps names to corresponding inputs. As discussed, UIV agent 107 determines name-input pairs, with the name field being identified using a learned classifier. Having identified the set of possible names at step 430, UIV agent 107 further identifies input fields corresponding to those names. In one embodiment, UIV agent 107 may identify the input field corresponding to a name by analyzing the row containing the name and adjacent rows, according to predefined rules. It is recognized that name fields generally appear close to input fields in a HTML form. For example, if the name field is in row 3, then UIV agent 107 may pick rows 2, 3, and 4 and pick the input field that is to the right of the name field in row 2. If no such input field exists, then UIV agent 107 may pick any input field in rows 2 or 4 that is closest to the name field.

At step 450, UIV agent 107 generates form metadata based on the determined rows and name-input pairs. One example of form metadata is shown above in Table 2. Such form metadata may indicate the distinct rows in the form, as well as the name-input pairs and other elements in those rows. Although step 450 is illustrated as a separate step, it will be understood that UIV agent 107 may alternatively generate form metadata as part of dividing the HTML form into rows at step 420 and determining name-input pairs at steps 430-440. For example, UIV agent 107 may add row metadata to a file after separating rows in the HTML form and then add name-input pair metadata to the file after identifying name-input pairs.

At step 460, UIV agent 107 transmits the form metadata to client device 125. UIV agent 107 may transmit the form metadata using any feasible channel, such as a virtual desktop infrastructure (VDI) channel between remote desktop server 100 and virtual desktop client 126. Then, at step 470, native form renderer 127 renders the native UI form based on the metadata received from UIV agent 107. As discussed, native form renderer 127 is a client-side application configured to construct and display "native" UI elements having the same functionality and information as corresponding UI elements in the HTML form based on form metadata received from UIV agent 107. For example, HTML input text field <input type="text"> may be mapped to UITextField in the iOS operating system (OS), to an EditText in the Andriod OS, and to a TextBox in Windows. A native UI form may then be constructed having the mapped UI elements. For example, native form renderer 127 may build a complete memory model of the form from the metadata, including the elements and rows in the form, and then use UI control to regenerate the form and also bind event function onto UI control.

In one embodiment, the original HTML form may also be rendered, and the native UI form may be rendered as a pop-up in front of the HTML form, either automatically or in response to user action causing the native UI form to be rendered.

At step 480, native form renderer 127 receives user input as native UI events when the user inputs text or otherwise interacts with the native UI form rendered at step 470. Then at step 490, native form renderer 127 forwards the native UI events as HTML events. As discussed, the forwarded events may include inputting text, clicking a button, and the like, while the forwarding itself may include transforming the native UI events to HTML UI events and transmitting the HTML UI events to browser 109. For example, when a user enters text into a field of the native UI form or presses the submit button of the native UI form, native form renderer 127 may forward the native UI text input or button clicking events as HTML events so that the same text is input into the HTML form or the same HTML form information is submitted.

Figure 5:
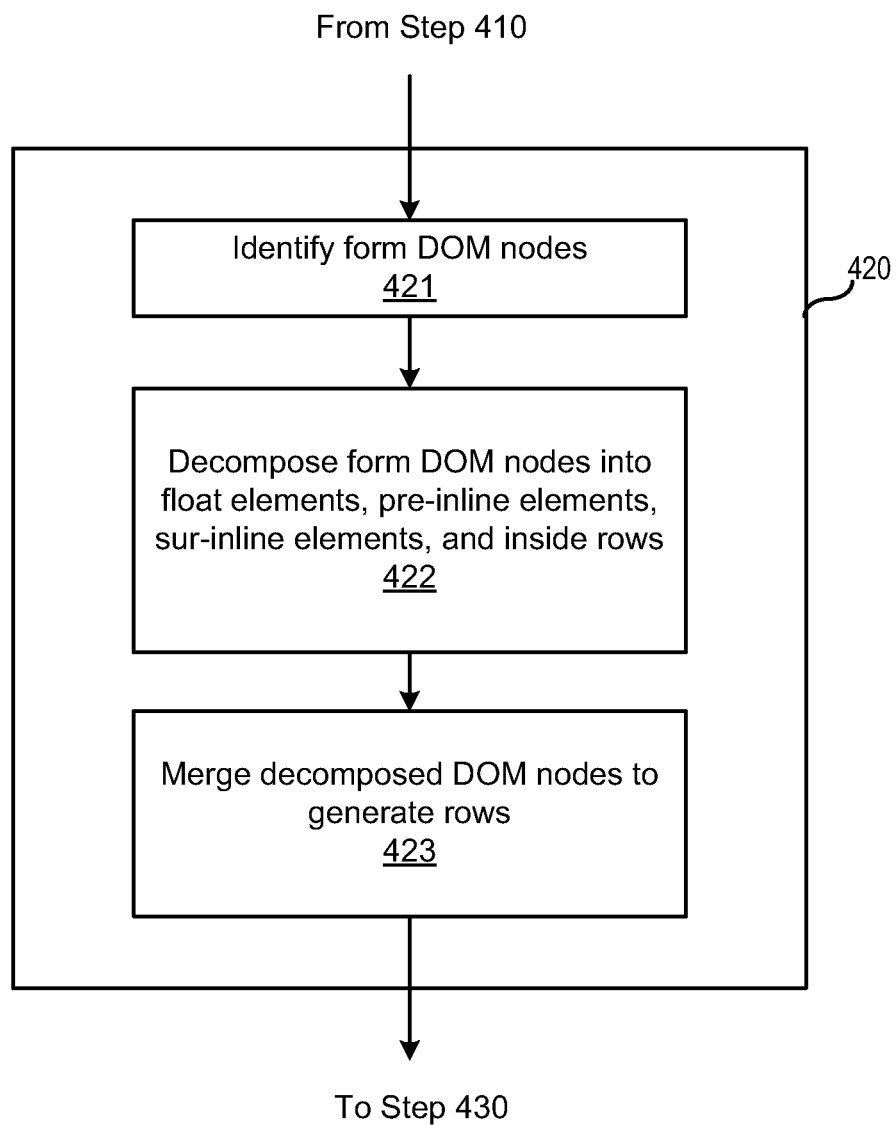
FIG. 5 illustrates in greater detail one of the steps of the method of FIG. 4.

FIG. 5 illustrates step 421 of method 400 in greater detail, according to an embodiment. As shown, UIV agent 107 identifies DOM nodes for a form at step 421. Given a DOM tree, the DOM nodes corresponding to a form include form nodes and their child nodes. In one embodiment, UIV agent 107 may recursively parse the DOM nodes corresponding to a "form" by, e.g., invoking a function that accepts a DOM node as input and calls itself recursively.

At step 422, UIV agent 107 decomposes the form DOM nodes into float elements, pre-inline elements, sur-inline elements, and inside rows. Each form row may include zero or more float elements that float to the beginning or end of the row. Pre-inline elements are inline child elements at the beginning of the DOM node, before a row break. Such pre-inline elements may be merged with inline elements at the end of a previous DOM node, referred to herein as sur-inline elements. Inside rows are rows formed by row breaks in the DOM node, such as rows formed by block elements.

At step 423, UIV agent 107 merges the decomposed DOM nodes to produce rows. In one embodiment, float elements may be placed at the beginning of rows. Sur-inline elements, if any, from a previous DOM node are then merged with pre-inline elements, if any, from the current DOM node to form a row. Inside rows (with their float elements) are kept as individual rows, without merging. It should be understood that float elements may also have child block elements with more than one line, and such float elements may be treated as float block elements that cause row breaks.

Figure 6:
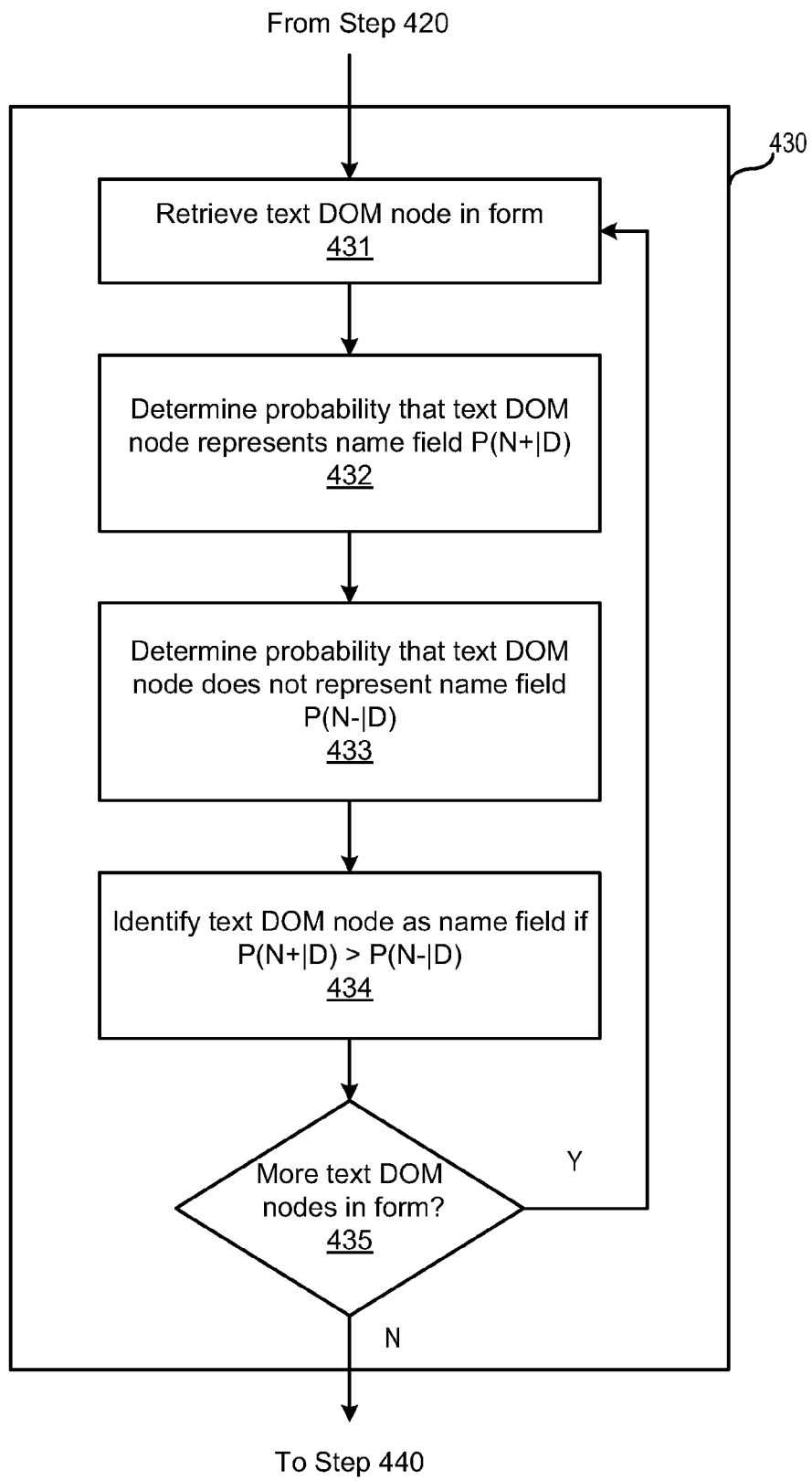
FIG. 6 illustrates in greater detail another step of the method of FIG. 4.

FIG. 6 illustrates step 422 of method 400 in greater detail, according to an embodiment. As shown, UIV agent 107 retrieves a text DOM node in a form at step 431. At step 432, UIV agent 107 determines the probability that the text DOM node is a name field $P(N+|D)$. DOM node D is defined by a set of attribute-value pairs, such as "bold": true, "color": "blue," and the like. According to Bayes' theorem, the probability that a given text DOM node is a name field $P(N+|D)$ is given by $P(N+|D)=P(D|N+)*P(N+)/P(D)$. The $P(D)$ term can be ignored because, as discussed in greater detail below, $P(N+|D)$ is divided by the probability that the text DOM node is not a name field $P(N-|D)$ and thus the $P(D)$ terms drops out. The $P(N+)$ term may be calculated "as the ratio of name fields to all text DOM nodes." This ratio is a prior probability that can be determined experimentally from training data. In particular, manually classified training data may be used to compute such prior probabilities. By naïve Bayes, the $P(D|N+)$ term may be calculated as:

$$P(D\mid N+) = P(\text{attribute}_1 = v_1,\ \text{attribute}_2 = v_2,\ \ldots \text{attribute}_n = v_n \mid N+)$$
$$= P(\text{attribute}_1 = v_1 \mid N+) * P(\text{attribute}_2 = v_2 \mid N+) * \ldots * P(\text{attribute}_n = v_n \mid N+),$$

where $P(\text{attribute}_i=v_i|N+)$ can itself be calculated as "the ratio of name fields whose attribute$_i$ is $v_i$ to all text DOM nodes." Similar to $P(N+)$, this ratio can be determined experimentally from training data. For example, if attribute$_i$ is "bold" and $v_i$ is true, then $P(\text{bold}=\text{true}|N+)$ is "the ratio of name fields whose bold attribute is true to all text DOM nodes."

At step 433, UIV agent 107 determines the probability that the text DOM node is not a name field $P(N-|D)$. Similar to the calculation of $P(N+|D)$, $P(N-|D)$ may be calculated as $P(N-$

|D)=P(D|N−)*P(N−)/P(D), where P(N−) is the ratio of text DOM nodes that are not name fields to all text DOM nodes, and P(D|N−) is calculated as $$P(D\mid N-) = P(\text{attribute}_1 = v_1,\ \text{attribute}_2 = v_2, \ldots \text{attribute}_n = v_n \mid N-)$$
$$= P(\text{attribute}_1 = v_1 \mid N-) * P(\text{attribute}_2 = v_2 \mid N-) * \ldots * P(\text{attribute}_n = v_n \mid N-),$$

where $P(\text{attribute}_i = v_i \mid N-)$ can be calculated as "the ratio of non-name field text DOM nodes whose $\text{attribute}_i$ is $v_i$ to all text DOM nodes."

At step 434, UIV agent 107 identifies the text DOM node as a name field if P(N+|D)/P(N−|D)>1. A text DOM node can be considered more likely to be a name field if P(N−|D)/P(N−|D)>1, and vice versa, because when P(N+F|D)/P(N−|D)>1, the probability that a given DOM node is a name of an input field is greater than the probability that the given DOM node is not a name of an input field.

Although techniques are described herein primarily with respect to transforming a form designed for PC browsers into a mobile native UI form, some embodiments may also transform other content related to forms and web pages. In one embodiment, form updates may be converted to metadata and transmitted to the mobile device. In another embodiment, alert messages may be transformed into mobile native UI alert messages by capturing alerts, transmitting the alerts to the mobile client device, and displaying the alerts using native UI elements at the mobile client device. For example, Javascript alert function invocations may be captured by a UIV agent and sent to the mobile client device, where the same alert is rendered as a native UI alert.

Although techniques are described herein primarily with respect to specific Web technologies (HTML and JavaScript), other languages or environments may be used instead or in addition. For example, the described techniques may be applied to web applications having a user interface implemented in ActionScript code executable in an Adobe Flash player, or in executable code for other environments such as Microsoft Silverlight.

Advantageously, techniques described herein permit forms designed for PC browsers to be converted to forms with UIs native to mobile devices. It is often more convenient for users to read and input information into such native UI forms.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of providing access to a markup document form, the method comprising:
    dividing the markup document form into rows based on row breaks;
    determining name fields in the markup document form which specify the names of input fields;
    determining the input fields in the markup document form which correspond to the determined name fields;
    generating UI metadata that specifies the rows and the name and input fields; and
    rendering, at a mobile client device and based on the UI metadata, a form having UI elements native to the mobile client device.

2. The method of claim 1, wherein the markup document form is divided into rows by performing steps including:

parsing nodes of a document object model (DOM) tree representing the markup document form;

decomposing the DOM nodes into float elements, pre-inline elements, sur-inline elements, and full rows;

placing the float elements at the beginning or end of rows; and merging the pre-inline elements and sur-inline elements of adjacent DOM node to form TOWS.

3. The method of claim 1, wherein the name fields are determined using a trained naïve Bayes classification scheme.

4. The method of claim 3,
wherein the naïve Bayes classification scheme gives the probability that, given a node of a document object model (DOM) tree, the given DOM node represents a name field and the node does not represent a name field, and
wherein the given DOM node is determined as being a name field if the probability that the given DOM represents a name field is greater than the probability that the given DOM node dose not represent a name field.

5. The method of claim 3, wherein the naïve Bayes classification scheme is trained using markup document forms with name fields and input fields that are manually classified.

6. The method of claim 1, wherein the input fields are determined based on at least proximity to the corresponding name fields.

7. The method of claim 1, further comprising, responsive to detecting user input via the native UI elements at the mobile client, forwarding the native UI input events as markup document form events.

8. The method of claim 1, wherein the markup document comprises an HTML document.

9. The method of claim 1, further comprising, capturing an alert and transmitting the captured alert to the mobile client device to be rendered using UI elements that are native to the mobile client device.

10. A non-transitory computer-readable storage medium comprising instructions that, when executed in a computing device, provide access to a markup document form by performing the steps comprising:
dividing the markup document form into rows based on row breaks;
determining name fields in the markup document form which specify the names of input fields;
determining the input fields in the markup document form which correspond to the determined name fields;
generating UI metadata that specifies the rows and the name and input fields; and
rendering, at a mobile client device and based on the UI metadata, a form having UI elements native to the mobile client device.

11. The non-transitory computer-readable storage medium of claim 10, wherein the markup document form is divided into rows by performing steps including:
parsing nodes of a document object model (DOM) tree representing the markup document form;
decomposing the DOM nodes into float elements, pre-inline elements, sur-inline elements, and full rows;
placing the float elements at the beginning or end of rows; and
merging the pre-inline elements and sur-inline elements of adjacent DOM node to form TOWS.

12. The non-transitory computer-readable storage medium of claim 10, wherein the name fields are determined using a trained naïve Bayes classification scheme.

13. The non-transitory computer-readable storage medium of claim 12,
wherein the naïve Bayes classification scheme gives the probability that, given a node of a document object model (DOM) tree, the given DOM node represents a name field and the node does not represent a name field, and
wherein the given DOM node is determined as being a name field if the probability that the given DOM represents a name field is greater than the probability that the given DOM node dose not represent a name field.

14. The non-transitory computer-readable storage medium of claim 10, wherein the input fields are determined based on at least proximity to the corresponding name fields.

15. The non-transitory computer-readable storage medium of claim 10, the steps further comprising, responsive to detecting user input via the native UI elements at the mobile client, forwarding the native UI input events as markup document form events.

16. The non-transitory computer-readable storage medium of claim 10, wherein the markup document comprises an HTML document.

17. The non-transitory computer-readable storage medium of claim 10, the steps further comprising, capturing an alert and transmitting the captured alert to the mobile client device to be rendered using UI elements that are native to the mobile client device.

18. A system comprising:
a processor; and
a memory, wherein the memory includes a program for reducing perceived read latency, the program being configured to perform operations for providing access to a markup document form, comprising:
dividing the markup document form into rows based on row breaks,
determining name fields in the markup document form which specify the names of input fields,
determining the input fields in the markup document form which correspond to the determined name fields,
generating UI metadata that specifies the rows and the name and input fields, and
rendering, at a mobile client device and based on the UI metadata, a form having UI elements native to the mobile client device.

19. The system of claim 18, wherein the name fields are determined using a trained naïve Bayes classification scheme.

20. The system of claim 18, wherein the input fields are determined based on at least proximity to the corresponding name fields.

* * * * *